United States Patent

Chartrain et al.

[11] Patent Number: 5,171,951
[45] Date of Patent: Dec. 15, 1992

[54] COMBINED MICROWAVE AND RESISTANCE HEATED ELECTRIC OVEN

[75] Inventors: Pierre Chartrain, Bourguebus; Olivier H. J. Gensbittel, Herouville, both of France

[73] Assignee: Moulinex (Societe Anonyme), Bagnolet, France

[21] Appl. No.: 638,458

[22] Filed: Jan. 7, 1991

[30] Foreign Application Priority Data

Jan. 10, 1990 [FR] France ................. 90 00235

[51] Int. Cl.$^5$ ............................................. H05B 6/80
[52] U.S. Cl. ...................... 219/10.55 E; 219/10.55 F; 99/421 H; 99/444; 99/DIG. 14
[58] Field of Search ............... 219/10.55 F, 10.55 E, 219/10.55 R; 99/419, 421 R, 421 H, 426, 427, 443 R, 444, 446, 447, 448, 450, DIG. 14

[56] References Cited

U.S. PATENT DOCUMENTS

| | | | |
|---|---|---|---|
| 2,885,951 | 5/1959 | Wolske | 99/421 H |
| 3,100,435 | 8/1963 | Mobley, Jr. | 99/421 |
| 3,199,438 | 8/1965 | Myler et al. | 99/421 H |
| 3,691,937 | 9/1972 | Meek et al. | 99/450 |
| 4,455,467 | 6/1984 | Dills | 219/10.55 E |
| 4,810,856 | 3/1989 | Jovanovic | 99/419 |
| 4,985,607 | 1/1991 | Oya | 219/10.55 E |

FOREIGN PATENT DOCUMENTS

| | | |
|---|---|---|
| 0332505 | 9/1989 | European Pat. Off. |
| 2226498 | 12/1973 | Fed. Rep. of Germany |
| 2422633 | 11/1975 | Fed. Rep. of Germany |
| 2105460 | 4/1972 | France |
| 2342048 | 9/1977 | France |

*Primary Examiner*—Philip H. Leung
*Attorney, Agent, or Firm*—Young & Thompson

[57] ABSTRACT

A kitchen oven comprises, in a chamber (2), a drippings pan (6) supporting a spit (8) and adapted to occupy two positions, either a cooking position in which the drippings pan is in the chamber and the spit is in the axle of a rotatable drive (9), or a retracted position in which the drippings pan is partially outside the chamber (2) and the spit (8) is free from the drive. The drippings pan and the walls (3) of the oven comprises mutually sliding surfaces (20, 21) so arranged that, prior to the cooking position, the surfaces exert on each other a force F directed toward the rear of the oven tending to position the drippings pan automatically in its cooking position.

8 Claims, 2 Drawing Sheets

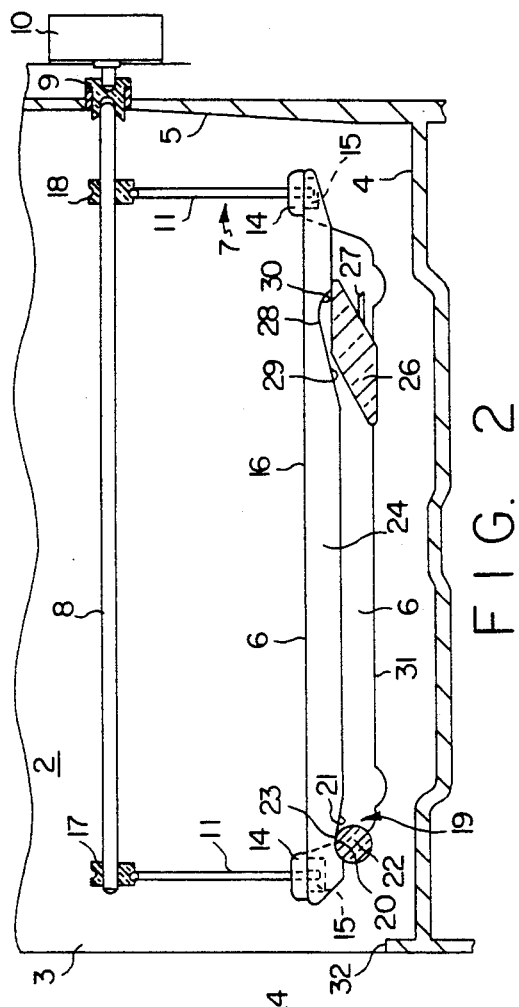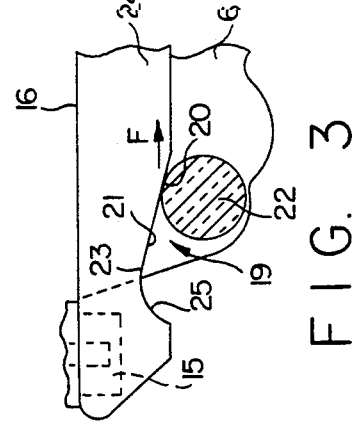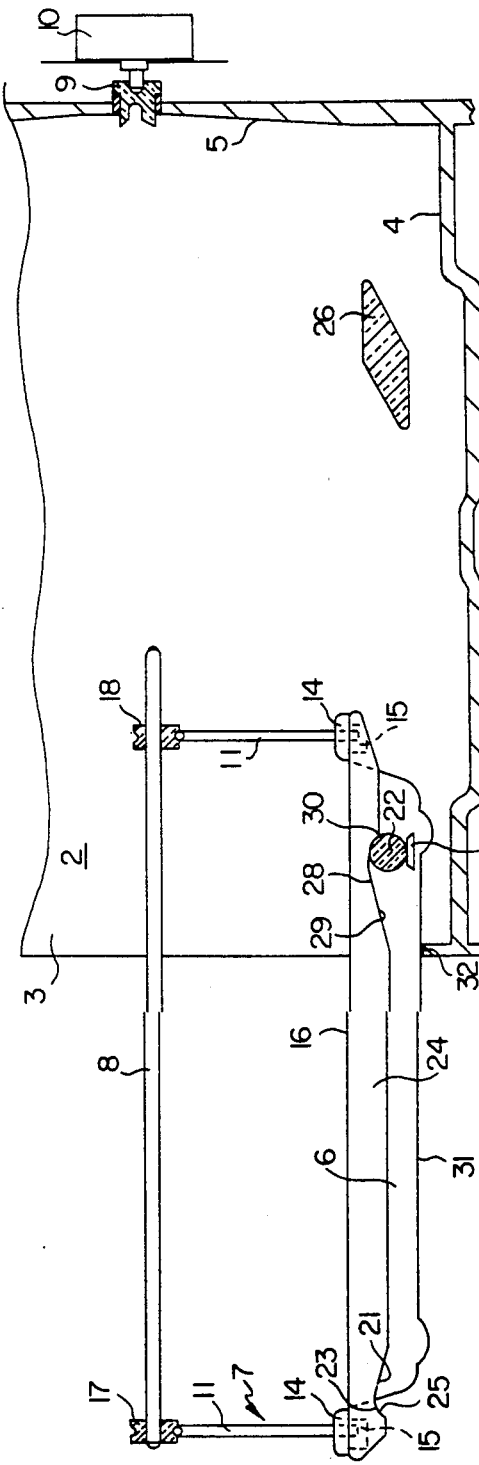

COMBINED MICROWAVE AND RESISTANCE HEATED ELECTRIC OVEN

The invention relates to a combined electric oven adapted to cook foodstuffs by means of resistance heating associated with microwave heating.

The invention relates more particularly to an oven of the type comprising, in a chamber defined by walls and a door, a drippings pan provided with support means receiving a spit and being adapted to occupy two positions, either a cooking position in which the drippings pan is within the chamber and the spit is coaxial with a rotatable drive mounted on one of the walls, or a retracted position in which the drippings pan is at least partially outside the chamber and the spit is freed from the drive.

In known combined resistance heated and microwave ovens, it is difficult to couple the axle of the spit perfectly with the drive. The user then has the tendency to insert the spit forcibly, which risks damaging the drive which, in a microwave oven, is of ceramic and hence is a fragile member.

The invention has for its object to overcome particularly this drawback and to provide a combined microwave/grill oven in which the coupling of the spit with the drive, on the one hand, will be simple, easy and without risk of the user being burned, and, on the other hand, does not risk damaging the drive.

According to the invention, the drippings pan and the walls of the chamber comprise cooperating means which comprise mutually sliding surfaces disposed such that, prior to the cooking position, the surfaces exert on each other a force directed inwardly of the oven tending to position the drippings pan automatically in its cooking position.

Thus, thanks to this arrangement, there is obtained, solely by displacing the drippings pan, the introduction of the spit and its automatic centering to effect coupling with the drive. Thus, once the drippings pan is placed in a position preliminary to the cooking position, the weight of the piece to be roasted will alone serve to advance the drippings pan to the rear of the chamber, by simple reaction of the surfaces sliding on each other. The user is no longer hampered by the inability to see into the chamber by the piece to be roasted which masks the drive and thus is not likely to damage the drive. During withdrawal, there is likewise obtained a disengagement of the spit from the drive, without touching the spit.

The user, not needing to insert his hands in the chamber to engage or disengage the spit, is no longer in danger of being burnt. Another advantage of the invention is that it is applicable equally well to spits disposed transversely as to spits disposed longitudinally relative to the side walls of the chamber.

Other characteristics and advantages of the invention will become apparent from the description which follows, by way of example, with reference to the accompanying drawings, in which FIG. 1 is a transverse sectional view of an oven according to the invention, in which the drive is disposed on the rear wall of the chamber;

FIG. 2 is a partial longitudinal cross sectional view on the line II—II of FIG. 1, showing the drippings pan in the cooking position;

FIG. 3 is an enlarged view of the coacting means showing the drippings pan in a position preliminary to the cooking position;

FIG. 4 is a view similar to FIG. 2 showing the drippings pan in the retracted position;

Figure 1:
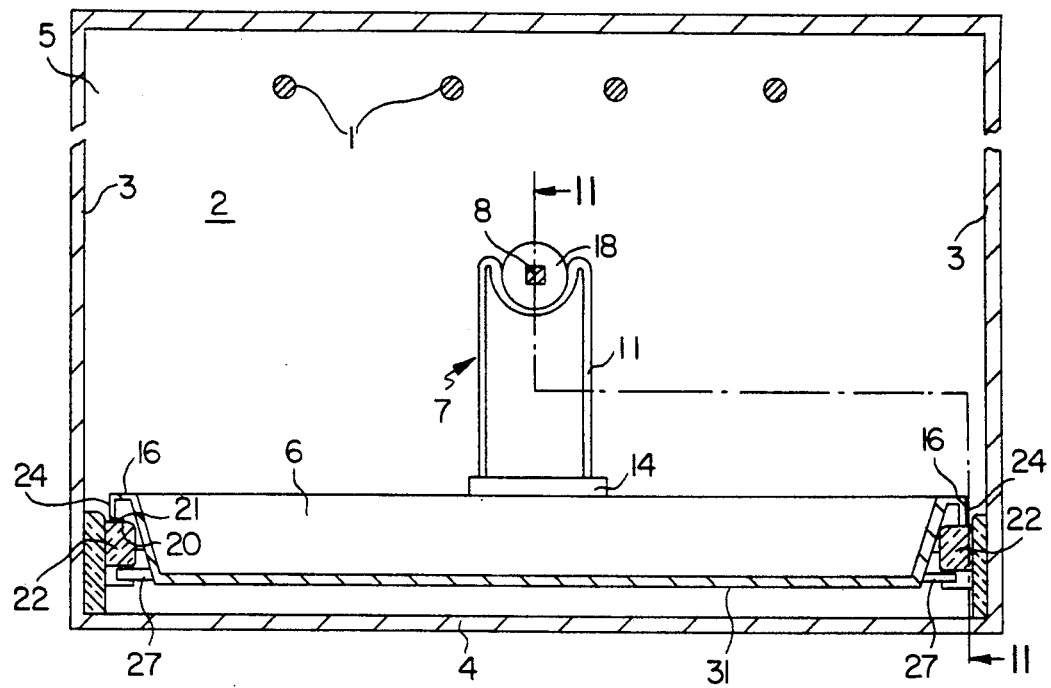

The combined electric oven shown in FIGS. 1-5 is adapted to cook foodstuffs by means of a heating resistance 1 in association with microwave heating by means of a magnetron (not shown). It comprises, in a chamber 2 delimited by walls 3, 4, 5 and a door (not shown), a metal drippings pan 6 provided with support means 7 receiving a metal spit 8 which can occupy two positions, either a cooking position (FIGS. 1, 2 and 5) in which the drippings pan 6 is within the chamber 2 and the spit 8 is in alignment with the axle of a rotatable drive 9 of ceramic driven in rotation by a motor 10 and mounted on one of the walls 3, 5, or a retracted position (FIG. 4) in which the drippings pan 6 is at least partially outside the chamber 2 and the spit 8 is free from the drive 9.

The support means 7 of the spit 8 are constituted by two opposite supports 11, 12, 13, of metal wire, which are each insulated, on the one hand, from the drippings pan 6, by an insulating base 14 of ceramic mounted removably in openings 15 provided in the edge 16 of the drippings pan 6 and, on the other hand, from the spit 8, by an insulating ring 17, 18 of ceramic which is traversed by the spit 8.

According to the invention, the drippings pan 6 and the walls 3 of the chamber 2 comprise coacting means 19 which comprise mutually sliding surfaces 20, 21 carried, on the one hand, by abutments 22 provided on the side walls 3 of the chamber at a slight distance from the base 4 and, on the other hand, by recesses 23 provided respectively in the corresponding lateral edges 16 of the drippings pan 6, such that, prior to the cooking position, the surfaces 20, 21 exert on each other a force F (FIG. 3) directed toward the rear 5 of the chamber 2 tending to position the drippings pan 6 automatically in its cooking position (FIG. 2).

This force F is created by the reaction produced on said surfaces 20, 21 by the weight of the piece to be roasted and of the drippings pan itself. This force F thus causes the drippings pan 6 to advance automatically from its preliminary position (FIG. 3) to its cooking position (FIG. 2).

The abutments 22 are constituted by two cylindrical lugs situated facing each other, each comprising a sliding surface 20 such that, the lateral edges 16 of the drippings pan 6 having vertical flanges 24 directed downwardly, the recesses 23 are provided in said flanges 24 and each have a rounded portion 25 serving as a stop hook and a portion which is inclined upwardly in the direction of introduction of the drippings pan 6 into the chamber 2 and which constitutes one of the sliding surfaces 21.

Other lugs 26 of lozenge shape are provided on the lateral walls 3 at the rear of the chamber to ensure good stability of the drippings pan 6 in the cooking position and the positioning of the spit 8 at the level of the axle of drive 9.

The drippings pan 6 also has tongues 27 disposed below recesses 28 provided in the vertical flanges 24 of drippings pan 6. The recesses 28 each have, on the one hand, a stop 29 inclined downwardly in the direction of retraction of the drippings pan 6, so as to facilitate the sliding of said recesses 28 on the abutments 22 and, on the other hand, a rounded portion 30 such that, in the retracted position, each abutment 22 will be wedged between the tongue 27 and a recess 28, the recesses 28 having a depth relative to the base 4 such that, in retracted position, the bottom 31 of the drippings pan 6 rests on the inlet edge 32 of the chamber 2 so as to limit retraction and swinging of the drippings pan 6.

The use of the drippings pan 6 according to the invention is thus particularly simple.

The drippings pan occupying at the outset its retracted position (FIG. 4), the user, to position it within the chamber 2, presses it toward the rear 5. The inclined abutments 29 of the recesses 28 and then the vertical edges 24 of the drippings pan 6 slide on the abutments 22. When the drippings pan arrives at its said preliminary position (FIG. 3), the inclined portions 21 of the recesses 23 come into contact with the abutments 22 and cause the drippings pan 6 to slide automatically toward the rear of the chamber 2. At the same time, the flanges 24 of the drippings pan bear on the lozenge lugs 26. The drippings pan 6 therefore automatically comes into the cooking position (FIG. 2) and the spit 8 is aligned with the axle of drive 9.

To withdraw the drippings pan 6, the user pulls horizontally on the drippings pan to its retracted position (FIG. 4). The abutments 22 wedge respectively between a tongue 27 and a recess 28 and the bottom 31 of the drippings pan comes to bear against the inlet edge 32. This position prevents swinging of the drippings pan provided with the spit and permits the user to baste the roast or control its cooking.

When the user wishes to remove the drippings pan 6 entirely, for example to clean it, he pushes it slightly into the interior so as to disengage the abutments 22 from the tongues 27 and then raises the drippings pan 6 above the abutments 22.

In the embodiment of the invention shown in FIGS. 1, 2 and 4, the drive 9 is disposed on the rear wall 5 and the spit 8 is disposed longitudinally of chamber 2. The two support 11 are fixed and the spit is guided in translation by a ring 17 fixed to the spit 8 and a ring 18 fixed to the support 11, such that the spit 8 will be automatically coupled with the drive 9 when the drippings pan 6 is brought into the cooking position. Thus, when the drippings pan 6 advances to its cooking position, the end of the spit 8 automatically penetrates the drive 9.

Figure 5:
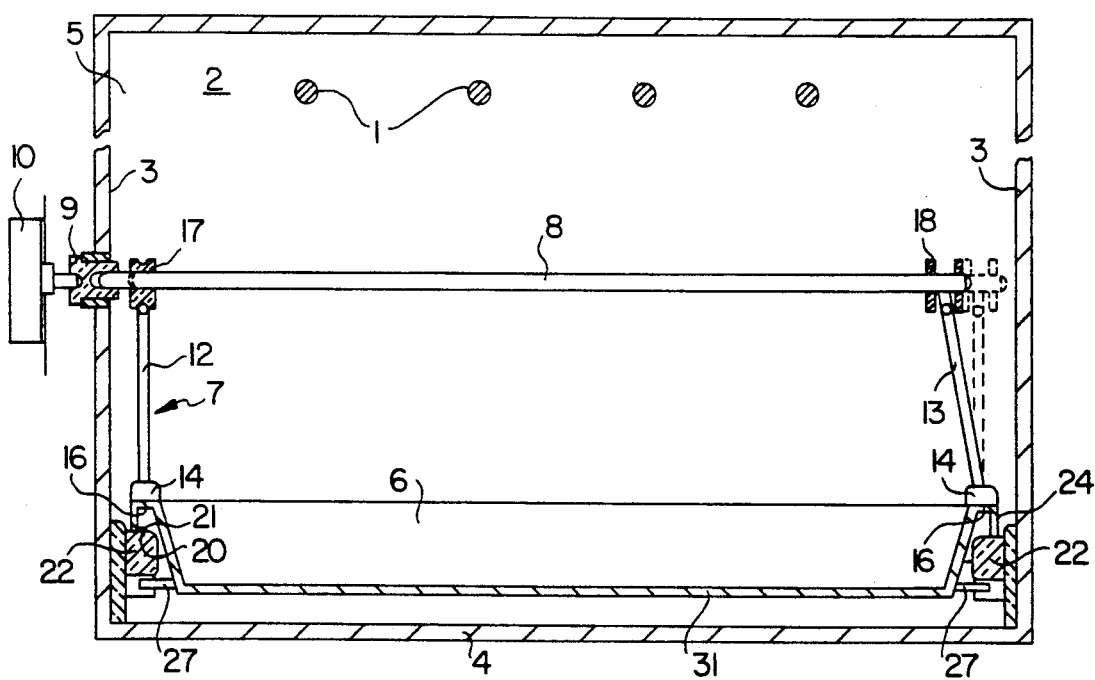
FIG. 5 is a transverse cross section of an oven according to the invention, in which the drive is disposed on a side wall of the chamber.

In another embodiment of the invention shown in FIG. 5, the drive 9 is disposed on a side wall 3 and the spit 8 is disposed transvesely of the chamber 2. One of the supports 12 is provided with a ring 17 and is mounted fixedly on the drippings pan 6, while the other support 13 is mounted movably and can swing toward drive 9, such that when the drippings pan 6 occupies its cooking position, the spit 8 being fixed for translation with the other ring 18, the swinging of said support 13 effects the sliding of the spit 8 within ring 17 and thus its coupling with drive 9.

Thus, when the drippings pan 6 is in its cooking position, the spit 8 is within the axle of drive 9 and it suffices to swing the moveable support 13 thereby to couple spit 8 with drive 9 by translatory movement.

During all the cooking operation and the rotation of the drive 9, the force F maintains the correct coupling of the spit 8 with drive 9, while preventing the backward movement of drippings pan 6.

What is claimed is:

1. In a combined electric oven adapted to cook food by means of a heating resistance (1) combined with heating by microwave and comprising, in a chamber (2) defined by lateral walls (3), a base (4) and a rear wall (5), and a door, a drippings pan (6) provided with support means (7) receiving a spit (8) and adapted to occupy two positions, either a cooking position in which the drippings pan (6) is within the chamber (2) and the spit (8) is engaged with the axle of a rotatable drive (9) mounted on one of the walls (3, 5), or a retracted position in which the drippings pan (6) is at least partially outside the chamber (2) and the spit (8) is free from the drive (9); the improvement wherein the drippings pan (6) and the walls (3) of the chamber (2) comprise coacting means (19) which comprise mutually sliding surfaces (20, 21) so arranged that, before the drippings pan reaches said cooking position when moving from said retracted position to said cooking position, the surfaces (20, 21) exert on each other a force F directed toward the rear wall (5) of the chamber (2) tending to position by its own weight the drippings pan (6) in said cooking position.

2. Combined electric oven according to claim 1, wherein the sliding surfaces (20, 21) are carried by abutments (22) provided on the side walls (3) of the chamber and by recesses provided respectively in corresponding side edges (16) of the drippings pan (6).

3. Combined electric oven according to claim 2, wherein the abutments (22) are comprised by two cylindrical lugs situated facing each other while the drippings pan has lateral edges (16) with vertical flanges (24) directed downwardly, and the recesses are provided in said flanges (24) and each have a portion which is inclined downwardly in the direction of introduction of the drippings pan (6) into the chamber (2) and which constitute one of said sliding surfaces (21).

4. Combined electric oven according to claim 3, wherein the drippings pan (6) also comprises tongues (27) disposed below the recesses provided in the vertical flanges (24) in the drippings pan such that in the retracted position each abutment (22) will be wedged between one of said tongues (27) and one of said recesses, the recesses having a depth relative to base (4) of the oven such that, in said retracted position, the bottom (31) of the drippings pan (6) rests on an entrance edge (32) of the chamber (2), so as to limit retraction and swinging of the drippings pan (6).

5. Combined electric oven according to claim 1, wherein the support means (7) of the spit (8) are constituted by two opposed supports (11, 12) which are each insulated from the drippings pan (6) by an insulating base (14) mounted in openings (15) provided in an edge (16) of the drippings pan and from the spit (8) by an insulating ring (17, 18) which is traversed by the spit (8).

6. Combined electric oven according to claim 5, wherein the drive (9) is disposed on the rear wall (5) and the spit (8) is disposed longitudinally of the chamber (2), the two supports (11) being fixed such that the spit (8) will be coupled with the drive (9) when the drippings pan (6) is brought to the cooking position.

7. Combined electric oven according to claim 5, wherein the drive (9) is disposed on a side wall (3) and the spit (8) is disposed transversely of the chamber (2), one of the supports (12) being provided with one (17) of said insulating rings (17, 18) and being fixedly mounted on the drippings pan (6), while the other support (13) is movably mounted and can swing toward the drive (9) such that when the drippings pan (6) occupies its cooking position, the spit (8) being fixed in translation with the other insulating ring (18), the swinging of said support (13) effects coupling of the spit (8) with the drive (9).

8. Combined electric oven according to claim 7, wherein the drippings pan (6) is metallic and the insulating bases (14) and the insulating rings (17, 18) and the drive (9) are made of ceramic dielectric materials, while the spit (8) and the supports (11, 12, 13) are metallic.

* * * * *